Nov. 25, 1969     B. S. DANIEL     3,479,709
STRAND TREATMENT
Original Filed Jan. 13, 1958     5 Sheets-Sheet 1
Fig. 1
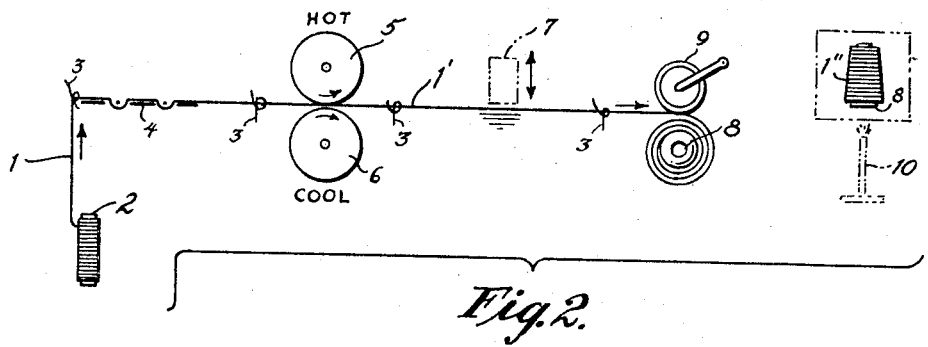
Fig. 2
Fig. 3.     Fig. 3A.
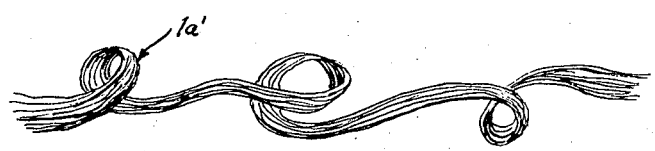
Fig. 4.
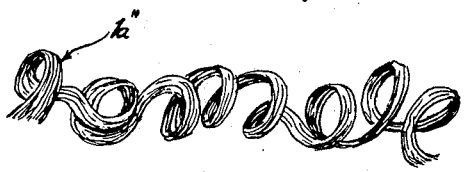
Fig. 5.
INVENTOR.
BENJAMIN S. DANIEL
BY McClurg & Weiser
ATTORNEYS INVENTOR.
BENJAMIN S. DANIEL
BY McClure & Weiser
ATTORNEYS Nov. 25, 1969

B. S. DANIEL 3,479,709

STRAND TREATMENT

Original Filed Jan. 13, 1958

INVENTOR.
BENJAMIN S. DANIEL
BY McClurg & Weiser
ATTORNEYS

INVENTOR.
BENJAMIN S. DANIEL
BY
ATTORNEYS

Nov. 25, 1969  B. S. DANIEL  3,479,709
STRAND TREATMENT
Original Filed Jan. 13, 1958  5 Sheets-Sheet 5
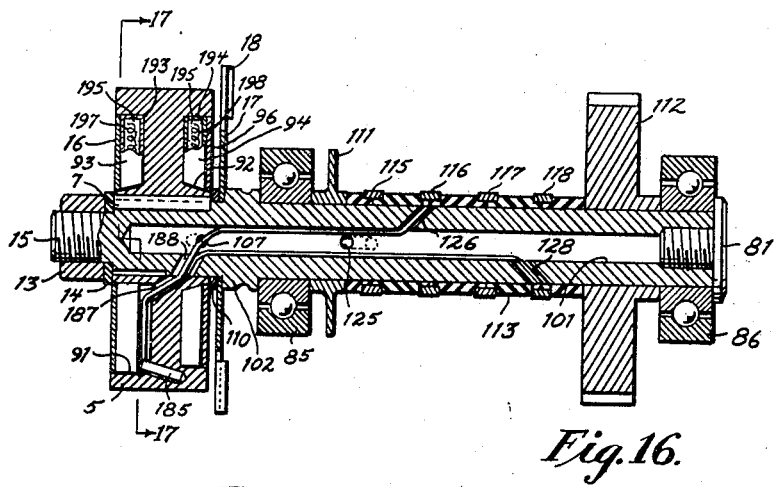
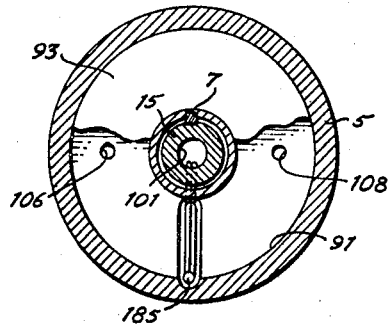
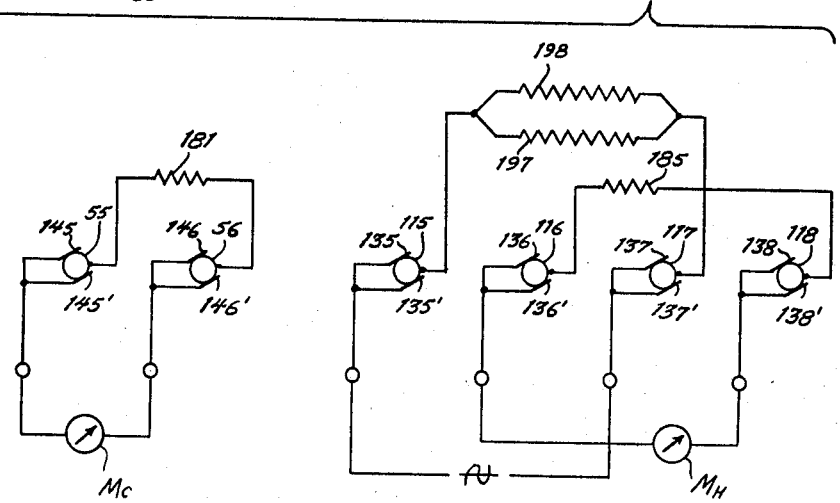
INVENTOR.
BENJAMIN S. DANIEL
BY McClurg & Weiser
ATTORNEYS United States Patent Office 3,479,709
Patented Nov. 25, 1969

3,479,709
STRAND TREATMENT
Benjamin S. Daniel, West Point, Ga., assignor, by mesne assignments, to Techniservice Corporation, Philadelphia, Pa., a corporation of Pennsylvania
Original applications Jan. 13, 1958, Ser. No. 708,666, now Patent No. 3,358,345, and Oct. 19, 1965, Ser. No. 498,050, now Patent No. 3,358,344, both dated Dec. 19, 1967. Divided and this application Dec. 8, 1967, Ser. No. 689,032
The portion of the term of the patent subsequent to Dec. 19, 1984, has been disclaimed
Int. Cl. D02g 1/08
U.S. Cl. 28—72                                        12 Claims

ABSTRACT OF THE DISCLOSURE

This invention relates to processing of textile strands, concerning particularly modification of the configuration of monofilament or multifilament textile strands to impart desirable deviation from rectilinearity or surface regularity to the component filament(s) thereof. This is done by establishing a temperature differential or gradient across such a strand, from one side to the opposite side thereof, preferably by forwarding it by a pair of nip rolls, one hot and one cool. The resulting strand assumes a generally crinkled, coiled, or curled configuration, which may be accentuated by rotation of the respective rolls at unequal surface speeds and by subsequent relaxation under substantially uniform heating. A novelty thick-and-thin effect results from intermittent optional separation of the treating rolls to provide spaced lengths of untreated or variably treated strand.

---

This application is a division of my copending patent applications, Ser. No. 708,666 filed Jan. 13, 1958 and Ser. No. 498,050 filed Oct. 19, 1965, both issuing on Dec. 19, 1967, as Patents 3,358,345 and 3,358,344, respectively.

Several well known techniques, primarily physical or mechanical, exist for performing an operation usually called "crimping" or "crinkling" upon strands (usually made up of continuous filaments, i.e., filaments of indefinite length greater than that of natural staple fibers) composed of synthetic fiber-forming compositions. These include "gear-crimping," which utilizes the teeth of a gear or a similarly serrated element, sometimes heated, to impart a periodic undulation or similar deviation from rectilinearity to a strand contacted thereby; "twist-crimping," which involves twisting and untwisting (or false-twisting) of a strand subjected to high temperature while in the twisted (or false-twisted) condition and produces a more or less distorted helical configuration; and "stuffer-crimping," which relies upon the bending back and forth of a strand as it is forced into a confining chamber, also often heated, to impart a generally irregular or random zig-zag configuration thereto. Chemical treatments also are known for distortion of the surface of a strand or of its filamentary components for a like purpose, the nature of such treatment depending upon the chemical and physical properties of the strand composition.

The complexity of these various processes is a deterrent to their commercial practice, and while some product irregularity is desirable, excessive irregularity often results from uneven access of treating medium, such as heat or chemicals, to the strand being processed. The usual purpose of any such treatment is to modify undesirably smooth or straight filaments (often also translucent and hydrophobic, as well), which are on that account not too satisfactory for use in apparel, to confer upon them the bulkiness, warmth, and covering power associated with staple yarns composed of natural fibers.

A primary object of the present invention is novel modification of synthetic filamentary strands to impart to them desirable configurational characteristics not present in their as-produced state. An object is improved crinkling of thermoplastic filaments. A particular object is provision of crinkled filaments of synthetic linear polymers exhibiting a transversely directed gradient of molecular alignment or orientation with respect to the filamentary axis. Other objects of this invention, together with means and methods for attaining the various objects, will be apparent from the following description and the accompanying diagrams.

FIG. 1 is a block diagram illustrating practice of the present invention; FIG. 2 is a schematic representation of apparatus useful in practicing the invention; FIG. 3 is a side view of an unmodified continuous multifilament strand, and FIG. 3A is a transverse cross section of the same strand; FIG. 4 is a similar view of the strand of FIG. 3 after rolling treatment according to this invention; FIG. 5 is a similar view of the strand after subsequent relaxation; FIG. 6 is a side view of a thin longitudinal section or cut of the same strand after dispersal of the component filaments relative to one another; FIG. 7 is a transverse cross section (enlarged) of a filament of the strand of the immediately preceding views; FIG. 8 is a side view (enlarged) of a monofilament strand treated according to this invention; FIG. 9 is a transverse cross section (further enlarged) of the same monofilament; and FIG. 10 is a diagrammatic representation of apparatus useful in the rolling zone according to this invention.

FIG. 11 is a front view of apparatus constructed according to the present invention; FIG. 12 is a sectional plan of that apparatus, taken at 12—12 of FIG. 11; FIG. 13 is a front sectional elevation of the same apparatus, taken at 13—13 of FIG. 12; FIG. 14 is a sectional elevation (enlarged) along the axis of a subcomponent of the apparatus, taken at 14—14 of FIG. 13; FIG. 15 is a front sectional elevation of that subcomponent, taken at 15—15 of FIG. 14; FIG. 16 is an axial sectional elevation (enlarged) of another subcomponent of the apparatus, taken at 16—16 of FIG. 13; FIG. 17 is a front sectional elevation of the latter subcomponent, taken at 17—17 of FIG. 16; and FIG. 18 is a schematic circuit diagram of electrical elements of the apparatus.

In general, the objects of the present invention are accomplished by applying to a plasticizable (preferably themoplastic) filamentary strand an agent effective to establish within the strand a gradient of plasticization of the strand composition directed from one side of the strand transversely toward the opposite side, extending the strand along the first side relative to the opposite side, and removing the plasticizing agent from the strand to leave it relatively extended along the previously plasticized side. The invention contemplates performance of this process, particularly upon thermoplastic strands by means of a pretensioning device through which the strand passes, a pair of counter-rotating nip rolls adapted to receive and forward the pretensioned strand therebetween, thermal means adapted to establish a temperature differential transversely of the strand entering the roll nip and preferably including internal heating means for one of the rolls and cooling means for the other roll, and a winding device adapted to withdraw the strand from the rolls under substantially lower temperature. A linear polymeric filament subjected to the foregoing process, as by means of the specified apparatus, is characterized most desirably by a transversely directed gradient of molecular alignment or orientation with respect to the filamentary axis and by a relatively flat face along one side of the filament, at or near which the minimum axial orientation exists.

FIG. 1 indicates in block form the steps undergone by a strand being treated as preferred according to this invention: pretensioning, rolling, opening (optional, multifilament only), winding, and relaxation (optional upon completion of the first two or more steps). For the purposes of this specification, the term "strand" means a single continuous filament or "monofilament," a bundle of continuous filaments or "multifilament," or one or more continuous filaments grouped with staple fibers or other discontinuous components except where the context indicates which one or other of these particular meanings is intended.

FIG. 2 is a schematic representation of apparauts for performing the indicated steps. Strand 1, shown as withdrawn from bobbin 2 and passing through the first of a number of simple pigtail guides 3, is pretensioned by conventional gate-tensioner 4, is forwarded through the nip of a pair of rolls 5, 6 denoted respectively as "HOT" and "COOL" (after which the strand itself is denoted as 1' to distinguish from the untreated portion 1), and is wound up onto a cone or similar holder 8 driven by contacting roll 9 (usually pivotally mounted, as shown, and often also designed to traverse the strand along the holder in conventional manner). The step of opening the strand may be accomplished by vibrator 7 (driven electromagnetically, for example) indicated in broken lines just ahead of the windup. The relaxation step is indicated diagrammatically as a heating of the strand (denoted as 1" to avoid confusion of it with the portions at the preceding stages) on the wound package, which should be collapsible accordingly, in an enclosure (indicated by broken lines), as by the indicated burner 10; this convenient representation does not conflict, of course, with the frequent desirability of accomplishing the relaxation step during winding of the strand, whether in packaging or unpackaging, as by passage through a heated chamber or over one or more heated surfaces, as will be readily apparent.

FIG. 3 shows untreated multifilament strand 1a from the side, and FIG. 3A shows the same strand in transverse cross section, revealing it to be a more or less cylindrical bundle of substantially identical filaments. No particular twist is indicated, although twist may be present in the strand or in the component filaments.

FIG. 4 shows the multifilament strand as 1a', being that of FIG. 3 after passage between the hot and cool rolls; the filaments are arranged side by side in a ribbon-like configuration, which itself is contorted in generally helical coils or loops of varying diameter, pitch, and frequency of occurrence.

FIG. 5 shows multifilament strand 1a", being the same as in the immediately preceding view but after subsequent relaxation; the coiling is clearly much tighter and more frequent, with reversal of pitch apparent at intervals. The pitch reversal is attributable to a discontinuity (alternation in direction) of otherwise gradual rotation of the strand about its own longitudinal axis before entering between the roll surfaces; it will be apparent that twist present in the strand (and it is substantially impossible to eliminate all twist from a traveling textile strand) will accumulate temporarily at the surface of the rolls or of a nearby guide, for example, thus rotating the strand until such accumulation passes between the rolls and the strand relieved therefrom twists again, frequently in the opposite direction. The filaments retain their side-by-side ribbon-like arrangement to a considerable extent.

Figure 6:

FIG. 6 shows a cut or thin longitudinal section through the center of the same multifilament strand, now denoted as 1d, after performance of the opening or dispersal step. The opening of the strand, or dispersal of the component filaments from one another, has largely eliminated the side-by-side arrangement. The previous helical pattern is also gone, and the individual filaments are characterized by bends, undulations, and similar deviations from rectilinearity—the general configuration being one aptly denoted as "crinkled." In this view the discontinuous aspect of the individual filaments is attributable, of course, to their sinuosity at the edges of the cut, involving repeated entrance and emergence of the filaments and consequent interruption of the illustration of any one of them. The resultant approximation to the appearance of staple fibers, albeit somewhat unusual in configuration and distribution) is suggestive of the staple-like benefits attained in strands according to this invention. The irregular crinkled configuration of the various filaments spaces them considerably from one another, somewhat less at the center than at the outside, of course, resulting in a strand of greatly increased bulk as compared to the original smooth multifilament. Dispersal of the filaments in the strand before relaxation would provide a similar configuration but with less apparent crinkling, and subsequent relaxation of a previously dispersed or opened strand would increase the crinkling accordingly.

Figure 7:
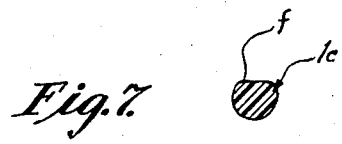

FIG. 7 illustrates in transverse cross section (considerably enlarged) a component filament, designated as 1c, of this strand at any stage after performance of the rolling step; it is seen to have a "D" shape, a flat face $f$ resulting on the side contacted by the hot roll and thereby interrupting the otherwise curvilinear outline.

Figure 8:
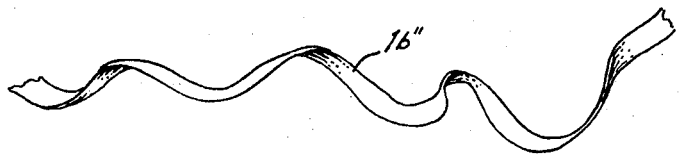

FIG. 8 shows relaxed monofilament 1b" treated according to this invention; it has assumed a ribbon-like configuration, having been flattened by the rolling to which it was subjected. The filament is helically convoluted, with occasional pitch reversal apparent.

Figure 9:
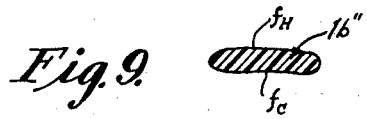

FIG. 9 shows monofilament 1b" in transverse cross section (also enlarged); it is seen to be more or less elliptical, having opposed relatively flat faces $f_H$ and $f_C$ resulting from contact with the hot and cool rolls, respectively, with its major axis being at least several times as long as its minor axis.

Figure 10:
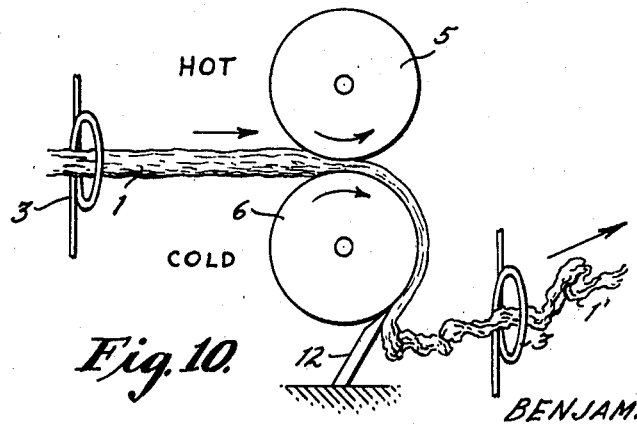

FIG. 10 shows, in diagrammatic fashion, passage of a strand between the treating rolls. After passing through pigtail guide 3, tensioned strand 1 is shown entering the nip of the rolls along the common tangent; it does not exit in the same direction but (as treated strand 1') remains in contact with the peripheral surface of the cool roll for the better part of a half circle—after which it contacts doctor blade 12, which facilitates removal of the strand from the roll surface. Withdrawn at relatively low tension through another guide 3, the strand which now tends to assume a helical configuration, then passes to the next step as previously indicated. Apparatus constructed to perform the rolling step is illustrated in greater detail in the subsequent views.

Figure 11:
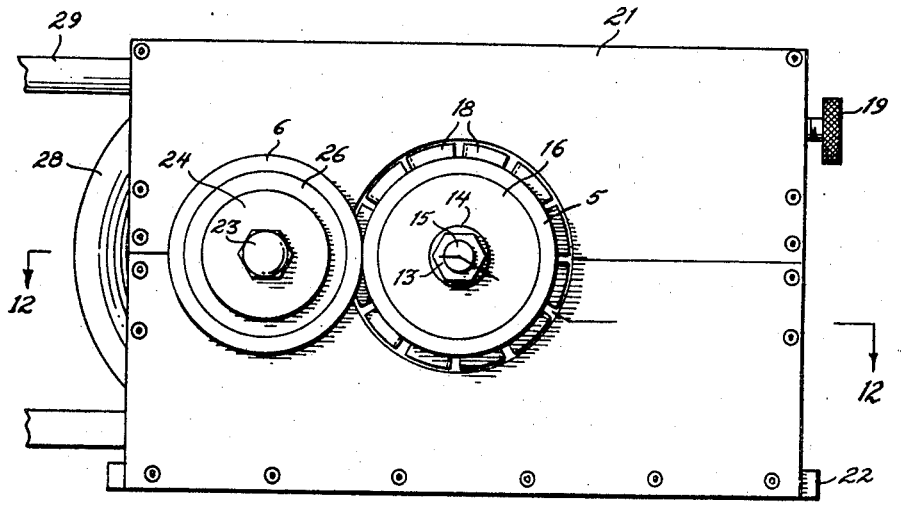

FIG. 11 shows such apparatus viewed from the front. Hot roll 5 is centered in front of housing 21, which rises from base 22. The roll is retained by nut 13 and washer 14 on axle 15 protruding from the housing. Metal ring 16 is retained against the end of the hot roll by the washer. Out of sight behind the roll is a radiating shield (17), which has fins 18 spaced about the portion thereof visible beyond the peripheral surface of the roll and just in front of the housing. A portion of pulley 28 is visible extending from behind the housing at the left, as is part of drive belt 29 for the pulley; extending from the right side of the housing near the top is thumbscrew 19.

To the left of the hot roll is cool roll 6 retained by cap nut 23 and washer 24 on its axle (not shown) at the same level as the axle of the hot roll. Metal ring 26 intervenes between the cool roll and the retaining washer. The peripheral surfaces of the two rolls are in contact with one another at the level of the axle centers, this orientation corresponding to a transformation of the roll axes from the position shown in FIGS. 2 and 10. Here, for convenience, the direction of travel of the strand is upward between the hot roll on the right and the cool roll on the left, but the orientation, though affecting the location of associated equipment, is not critical; similarly, except for requiring relocation of the doctor blade (when one is used), the roll rotation is reversible without affecting the mode of operation. The doctor blade (12) is conveniently separately mounted to the left of the cool roll and, therefore, absent from this view.

Figure 12:
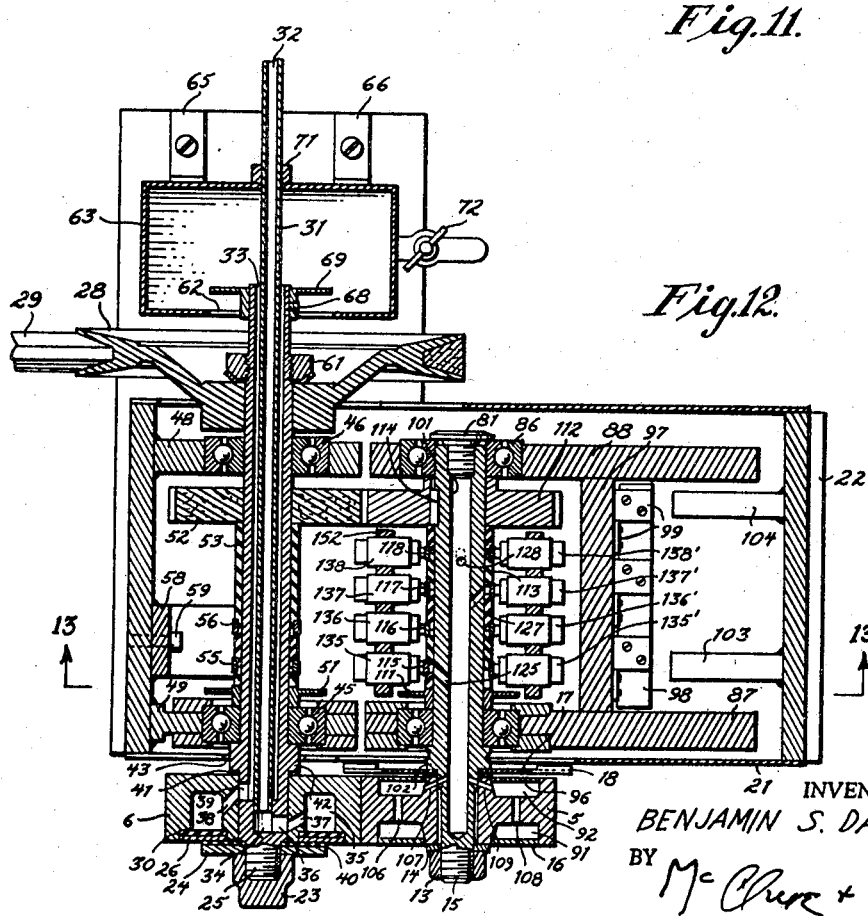

FIG. 12 shows the apparatus of FIG. 11 sectioned substantially horizontally, beginning at the left side on the level of the axles and continuing to the center of the axle of the hot roll, then declining gradually to about the periphery of the radiating shield and continuing at that level to the right side. Except for the slip rings associated with the axle of the roll, all electrical elements are omitted from FIG. 12 for clarity of the showing of the mechanical elements.

Except at its foremost end axle 25 for the cool roll is hollow, and it contains interior sleeve 31 resting rotatably in constricted hollow 34 within the axle where it is surrounded by the roll. Axial passage 32 is defined within the sleeve, and annular passage 33 between the outside of the sleeve and the inside wall of the axle. The constriction at the end of the axle communicates with interior 35 of the roll itself, which also is hollow, by means of radial bore 36 through the axle and connecting oblique bore 37 through the inner wall of the roll. The rear wall of the roll is solid but the front wall has in it an annular opening sealed by gasket 30, which is retained by ring 26. Resilient pad 40 spaces the ring from retaining washer 24. The hollow interior of the roll also communicates with the annular space about the sleeve by way of oblique bore 38 in the inner wall of the roll and connecting radial bore 39 through the side of the axle.

The rear wall of the cool roll rests against felt washer 41 to cushion it against the front edge of boss 42 of the axle, which extends through aperture 43 in the front wall of the housing. The axle is mounted rotatably in front and rear ball-bearing assemblies 45 and 46, respectively, supported in respective mounts 49 and 48 welded to the left side wall of the housing; the front assembly is located against the rear edge of boss 42. Surrounding the axle just to the rear of the front bearing assembly is grease shield 51. Mounted on the axle just to the front of the rear bearing assembly is drive gear 52. The portion of the axle intervening between the drive gear and the grease shield is covered by a layer of electrical insulating material 53, which has partly recessed in its outer surface conductive slip-rings 55 and 56, each of which is underlain by apertures in the insulating layer and an adjoining channel (shown in FIG. 14) through the axle itself. Bracket 58 affixed to the left wall of the housing by screws 59 (only one visible in this view) supports brushes (145, 145', 146, 146' shown in FIGS. 13, 14) in contact with the slip-rings. The cool roll and its axle and associated parts form a sub-assembly shown (on a larger scale) sectioned longitudinally in FIG. 15 and transversely in FIG. 15.

Figure 13:
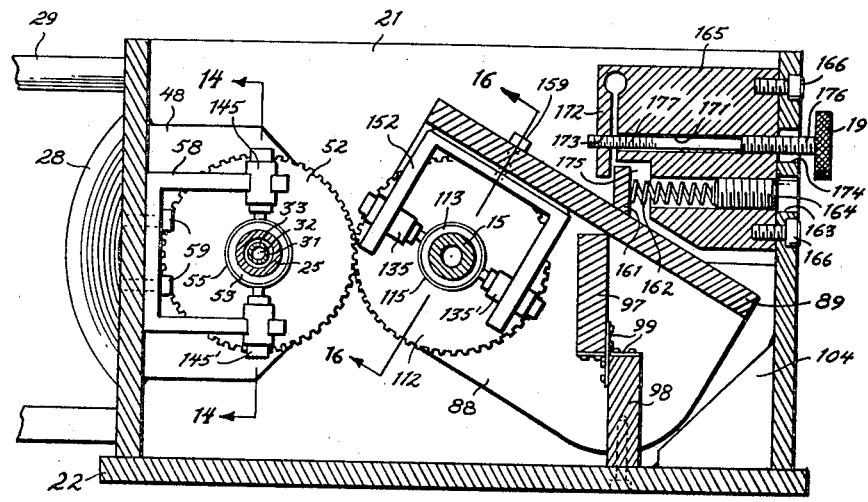

Pulley 28, previously shown (in part) in FIG. 12, also appears in FIG. 13, located rearwardly of the rear bearing assembly on the axle for the cool roll. The pulley, which is keyed to the axle (as subsequently shown in FIG. 14), is retained by large nut 61 screwed on to a threaded rear portion of the axle; to the rear of this threaded portion the axle is reduced in diameter and passes through aperture 62 in the front wall of tank 63. The axle terminates in the tank, which is affixed to the base by a pair of angle brackets 65, 66 attached to the rear wall of the tank. Affixed about the end of the axle within the tank by set screw 68 is flange 69. Fixed sleeve 31 continues out from the end of the axle, crosses the interior of the tank, and passes through an aperture in the rear wall, where it traverses seal 71. Drain cock 72 joins the tank at the right side.

FIG. 12 shows axle 15, which carries the hot roll, to be hollow also except at the front end, longitudinal bore 101 so formed being closed at the rear by plug 81. This axle is mounted rotatably in front and rear ball-bearing assemblies 85 and 86, respectively, supported in respective front and rear walls 87 and 88 of a pivotal mounting (designated as 89 in FIG. 13, which shows the mounting further). The front and rear walls of the mounting are seen in FIG. 12 to be affixed to upper support 97, which is laterally off-set from and connected to lower support 98 (itself screwed to the base) by a plurality of horizontal and vertical leaf springs 99 fastened by screws. Front and rear braces 103 and 104 for the right side wall of the housing also are visible in this view.

Hot roll 5 has a central flange defining front and rear annular channels 91 and 92, respectively, (to receive annular heating elements 93 and 94—not shown in this view); the channels are closed by respective rings 16 and 96. The longitudinal bore of the axle communicates with the channels of the roll by way of oblique bores 107 and 109 through the axle and apertures 106 and 108 through the flange of the roll. Radiating shield 17, with fins 18, rests against the front edge of boss 102 and is held slightly away from the rear wall of the hot roll by an intervening spacer (110, shown more clearly in FIG. 16). The rear edge of this boss adjoins the front ball-bearing assembly, and located on the axle immediately to the rear of that assembly is grease shield 111. Located on the axle immediately ahead of the rear ball-bearing assembly is driven gear 112 held by key 114, and the space intervening between the front and rear ball-bearing assemblies is covered by layer 113 of electrical insulation. Recessed at intervals partway into the peripheral surface of the insulated layer are slip rings 115, 116, 117, and 118, each of which is underlain by apertures in the insulating layer and by adjoining apertures through the axle itself, of which only 125, 127, and 128 (for rings 115, 117, and 118, respectively), appear in this view. FIG. 12 also shows the brush assemblies for the slip rings, each ring having a pair of brushes in contact with it: 135, 135' for ring 115; 136, 136' for ring 116; 137, 137' for ring 117, and 138, 138' for ring 118. The brushes in each pair of assemblies are connected to one another and to external leads (here omitted for clarity), as shown schematically in FIG. 18, being supported by U-shaped bracket 152 shown further in FIG. 13.

FIG. 13 shows the apparatus from the front, sectioned vertically just ahead of the brush assemblies. U-shaped bracket 58 affixed to the left wall of the housing by screws 59 supports (in close-fitting apertures in the arms of the U) above and below the axle for the cool roll the brush assemblies for the slip rings on that axle. Only front brush assemblies 145 and 145', located respectively above and below the axle, are visible in this view. At the right side of this view front brush assemblies 135 and 135' are carried similarly by U-shaped bracket 152 whose arms extend obliquely to the upper left and lower right, respectively, of the axle for the hot roll. Bracket 152 is retained by screws 159 (only one being visible in this view) to the underside of the top wall of pivotal mounting 89, which supports the axle. Back wall 88 of this mounting, shown only fragmentarily in the immediately preceding view, is affixed to the top wall; upper and lower supports 97 and 98, with interconnecting leaf springs 99, are located underneath the top wall.

The horizontal springs are affixed to the top of the lower support and the bottom of the upper support, while the vertical springs are affixed to the lower part of the right side of the upper support and the upper part of the left side of the lower support. The cross-over of the leaves establishes a locus (perpendicular to the plane of FIG. 13), for pivoting of the movable upper support, together with the axle and associated parts, with respect to the fixed lower support. The permitted degree of pivoting is not so great as to impair the meshing of drive gear 52 and driven gear 112 keyed to the axles for the cool and hot rolls, respectively.

Substantially vertical protuberance 161 affixed to the upper surface of the top wall of mounting 89 rests against compression spring 162 retained by plug 164 in bore 163 through control block 165. This block is affixed to the right side wall of the housing above and to the right of the mounting by screws 166. Above and parallel to the bore containing the spring, bore 171 extends through the immediately overlying portion of the control block, and bore 173 (aligned with, but of somewhat smaller diameter than, bore 171) extends through partially split-off portion 172 at the extreme left of the block, which overhangs protuberance 161, the block being split from the left edge of recess 175 above the protuberance to near the top of the block. Extending through the two aligned bores is thumbscrew 19, whose knurled head protrudes to the right through aperture 174 in the housing. The shaft of the thumbscrew has fine threaded portion 176 near the head end, in engagement with a correspondingly threaded portion of bore 171; it has coarse threaded portion 177 of smaller diameter at the opposite end, in engagement with correspondingly threaded bore 173, the intervening portion of bore 171 being unthreaded.

Figure 14:
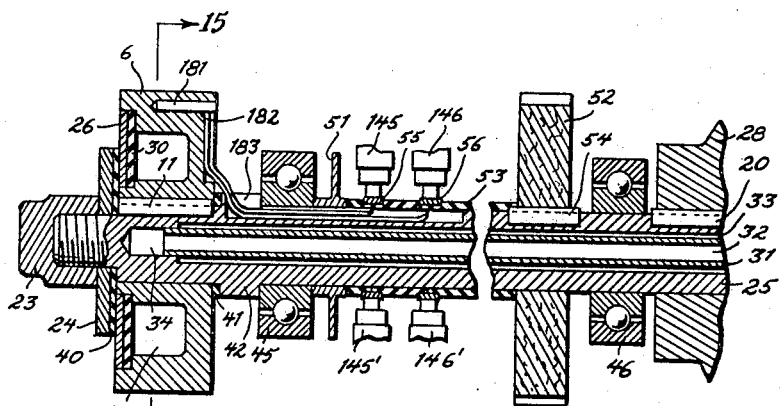
Figure 15:
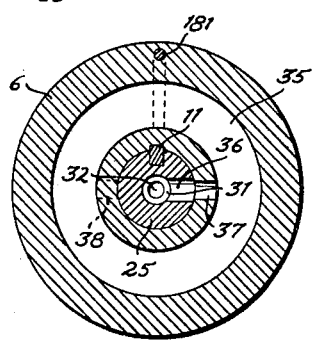

FIGS. 14 and 15 show the cool roll and associated elements somewhat enlarged, being sections taken, respectively, along and transversely of the axle. Elements shown here and not visible in previous views include keys 11, 20, and 54, which fasten cool roll 6, pulley 28, and drive gear 52, respectively, to axle 25. Also shown is thermistor 181 located underneath and parallel to the peripheral surface of the cool roll in recess 182, a shallow portion of which extends along the back of the roll to receive the pair of leads from slip rings 55, 56 through channel 183 extending from underneath the slip rings and emerging through boss 42 of the axle.

FIGS. 16 and 17 show the hot roll, also enlarged and in transverse and longitudinal sections, respectively. The roll is keyed to the axle by key 7. Thermistor 185, only the jacket of which is visible, is recessed in the flange of the roll just underneath the peripheral surface; it is connected to slip rings 116 and 118 by leads through apertures 186 and 188 extending through the flange of the roll and the axle, respectively, and apertures 126 and 128 extending obliquely through the axle. Apertures 107 and 125 for one of the leads to the heating elements appear also, but apertures 109 and 127 (previously shown) do not appear, being contained in the portion of the axle sectioned away. Heating elements 93 and 94 consist of annular metal housings 193 and 194, respectively, each filled with asbestos or similar insulation 195, with respective internal heating coils 197 and 198.

FIG. 18 shows the connections for the various electrical elements of the above apparatus. In the circuit for the cool roll, shown at the left, thermistor 181 is connected via slip rings 55 and 56 to brushes 145, 145′ and 146, 146′, from which leads connect to ohmmeter $M_C$ calibrated to read temperature as a function of the resistance of the thermistor. Similarly, in the circuit for the hot roll, thermistor 185 is connected via slip rings 116 and 118 to ohmmeter $M_H$ by way of brushes 136, 136′ and 138, 138′. Heating coils 197 and 198 are connected in parallel to one another and to an external power source (indicated schematically to be AC) through slip rings 115 and 117 and the associated brushes 135, 135′ and 137, 137′.

The operation of this apparatus is readily apparent. A motor (not shown) drives the belt affixed to the pulley of the cool roll. Rotation of that axle ensues, as does counter-rotation of the axle of the hot roll inasmuch as the two axles are geared directly to one another. The relative sizes of the gears and of the rolls themselves (all shown equal here) are selected so that the peripheral surfaces of the respective rolls turn at identical linear speeds.

Cooling fluid (usually water) is circulated through the cool roll, proceeding from a suitable source (not shown) through the circular bore of the axle toward the roll and returning along the coaxial annular passage to discharge into the tank provided for that purpose (from which it is drained off subsequently, with or without partial recirculation, as desired). The rate of circulation and temperature of the cooling fluid used may be controlled in any suitable manner to ensure the desired temperature at the surface of the cool roll.

The thermistor (i.e., a resistor having an appreciable, known temperature coefficient of resistance) located immediately beneath the surface of the cool roll facilitates the measurement in well known manner of the roll temperature by means of the ohmmeter to which it is connected via internal and external leads and slip rings, or by a suitable bridge circuit with indicator similarly connected for that purpose. If desired, appropriate feedback from the measuring circuit can be employed, as will be readily apparent to one having ordinary skill in the control art, to provide the desired conditions.

The temperature of the cool roll is affected by the temperature of the hot roll, of course. Having a thermistor similarly located and connected, the hot roll is heated by internal electrical resistance elements connected by internal and external leads and intervening slip rings to a suitable source of electrical potential. The temperature of the hot roll may be controlled by varying the current through the heating elements in any suitable manner in response to the indication received by means of the thermistor. To avoid hunting, with consequent cyclical deviation of the temperatures from the desired temperatures, it is desirable to combine the respective thermistors and their associated elements into a unified central circuit, which can be done in any suitable manner, as will be readily understood.

The desired temperatures depend primarily upon the composition, denier, and finish or other surface characteristics of the filamentary material to be processed and upon the processing rate and the roll pressure. The pressure of the rolls upon the intervening filaments and the minimum separation of the rolls from one another are readily adjusted; the pressure rises with increased insertion of the plug against the compression spring pressing against the protuberance of the mounting for the hot roll, and the minimum separation or gap at the roll nip increases upon rotation of the knurled thumbscrew in the direction of withdrawal from the containing block to move the partially split-off portion toward the protuberance.

Transverse deformation of the filaments, which is slight at low pressure of roll contact, increases at higher pressures, dependent upon the filaments contacted. High roll pressures are conducive to production of ribbon-shaped cross-section, in monofilaments especially, giving a ratio of major and minor transverse axes on the order of 3 to 5 or 6 to 1, or even 15 or 16 to 1, or higher. Ordinarily only fractional deformation occurs in the component filaments of multifilament. Of course, increased roll pressures or decreased minimum roll spacing can be expected to make greater demands upon both the heating and cooling systems, the temperature differential between the rolls tending to decrease because of increased conduction across the nip.

In general, it is preferred that the peripheral surface of the hot roll be maintained at a temperature approaching the softening temperature of the filaments being processed, with due regard for the time and pressure of contact with the filaments (which may be at or near room temperature when introduced to the rolls). The temperature of the cool roll should be appreciably less than that of the hot roll, sufficiently low to maintain the normally elastic condition of the strand at the cool side; the differential preferably is on the order of one-half the temperature (expressed in degrees Fahrenheit) of the hot roll when the latter temperature is on the order of several hundred degrees, as it will be for filaments of most widely used synthetic compositions.

For example, good results have been obtained upon both 15 denier monofilament and 40 denier (13 filament) multifilament nylon at from 150 to 200 yards per minute (much higher rates being permissible) with the hot roll operated at a temperature in the range from about 350° to 450° F., and the cool roll between about 175° and 225° F. Such yarn, having an initial elongation (to break) of about 35%, undergoes during the treatment a decrease to from about 20% to 25% elongation with a reduction in tensile strength of not more than 10% or 15%. After subsequent relaxation at 300° F. for five minutes the strand is found to have undergone a total reduction in overall length (i.e., end-to-end separation of a meandered length of strand) of from about 60% to 80% or more. A temperature differential of much more than about two hundred fifty degrees (F.) is not recommended for nylon because of unfavorable effect upon filament tenacities and related physical properties. Selection of proper operating temperature and related processing conditions for any particular strand within the usual range of compositions and deniers will be found well within ordinary skill of one familiar with the art, in the light of the present disclosure.

In practice, a strand of one or more filaments to be processed is fed upward into the nip of the rolls at a pretension of a fraction of a gram per denier, commonly about one-half gram per denier. Optimum pretension appears to depend to some extent upon the humidity to which the strand has been exposed; at ordinary room temperature, it is preferable to condition the strand to equilibrium at from about 50° to 70° relative humidity before treatment. It may be fed into the nip along the common tangent to the rolls or may contact one or the other of the rolls first; however, it is desirable to limit contact of the strand with the hot roll to avoid excessive plasticization.

With the side contacted by the hot roll relatively extended (i.e., as compared with the side contacted by the cool roll) the strand leaves the hot roll at the opposite side of the nip but preferably remains in contact with the surface of the cool roll for an appreciable time until being removed by the doctor blade, which is effective against ordinary adhesive forces and may be altered in position or extent as desired. To the extent that clinging of the strand to the cool roll is attributable to static charges, it may be minimized or reduced to an acceptable level by a suitable static eliminator, such as an adjacent ion source. While the treated strand may be withdrawn from the rolls along the common tangent instead of following the cool roll part of the way around, it is desirable to accomplish the desired deplasticization of the heated side more promptly than by mere dissipation of the heat to the atmosphere, and the cool roll is a convenient and effective means for doing so. Of course, other cooling means may be employed in the subsequent yarn path if desired.

The tension under which the strand is withdrawn from the treating rolls and wound up is conveniently maintained as low as practicable for effective winding operations, it being preferably no greater than the pretension applied to the untreated yarn, although higher tensions may be used where deplasticization is substantially completed before the strand leaves the cool roll. Under this low tension, the strand leaving the doctor blade appears noticeably helical in configuration. Observations of the treated strand indicate relative lengthening of the heated side with respect to the cool side. The full extent of the crinkling produced by treatment according to this invention is not apparent until after relaxation of the strand and, in the instance of multifilament, opening (i.e., dispersal of the respective filaments from their mutual alignment) as well, as indicated above. Both these steps may be deferred, if desired, until after the strand has been formed into fabric (as by knitting, weaving, or other technique) and then be accomplished by suitable heating and agitation, performed either together or separately and with the fabric dry, moistened, or in a liquid bath, for example.

Though difficult to describe or illustrate, the result of submitting a strand to the practice of this invention is readily perceptible in the treated strand, even to the unaided eye and hand. Further physical determinations of cross section and internal characteristics indicate alteration within the filaments so treated, as well as upon their surface. Besides the dimensional changes mentioned above, which are more or less readily apparent, such filaments composed of linear synthetic polymers evidence establishment of a well-defined transversely directed gradient of molecular orientation, as determined by customary physical methods, the minimum alignment or orientation with respect to the axis of each component filament being located at or near the side thereof (flattened, more or less) contacted by the hot roll. This orientation gradient, which is directed outward through the strand, with respect to the helical axis of the configuration of the treated filaments (present before opening or dispersion), appears to account to a goodly extent for the resilience of the crinkle imparted by the practice of this invention, as compared with pre-existing compressive or torsional (or other) crinkling or crimping methods.

While the above description is concerned specifically with heat as the plasticizing agent for the strand, it will be apparent that a chemical agent (e.g., formic acid, for nylon) may supplement heat for this purpose, being readily supplied to the peripheral surface of the plasticizing (i.e., "hot") roll, either from the interior or the exterior. The chemical composition of the strand will determine what solvents or swelling agents may be employed for this purpose. Use of steam or other readily condensable vapor as the plasticizing agent is undesirable because of the likelihood of condensation on the opposite (i.e., "cool") roll. The surface of the latter roll may be absorbent or neutralizing in character to counteract ill effects of transfer of the plasticizing agent to it. As has been mentioned above, conditioning of the strand at high relative humidity reduces the degree of restraining tension required, and the mildly plasticizing effect of high humidity or higher than normal room temperature upon the strand as a whole is beneficial so long as it does not predispose the rest of the strand to become plasticized when the principal plasticizing agent is applied to the side of the strand to be relatively extended.

The amount of extensional force necessary to produce the desired result is dependent, of course, upon the degree to which the strand is plasticized. While it is perhaps most convenient to treat the strand between a pair of identical (and identically driven) nip rolls, as indicated above, the rolls may differ from one another in composition, diameter, and surface configuration or texture and may rotate at unequal speeds. Intermittent separation of the rolls will permit crinkling of portions of a strand so treated, the intervening untreated portions remaining uncrinkled, as may be especially desirable for various apparel fabrics.

In addition to the desirable characteristics noted above, strands crinkled according to the present invention exhibit a ready dyeability notably absent from like strands crimped by conventional methods. The full benefits and advantages of this invention will become even more apparent to those undertaking to practice it in the light of the above teaching.

The claimed invention:

1. In treatment of a textile strand wherein the strand is forwarded past a treating location, the improvement comprising establishing a temperature differential transversely of the strand and forwarding the strand, with one side thereof relatively hot and the opposite side relatively cool, away from the treating location by force applied thereto at the treating location.

2. Strand treatment according to claim 1, wherein the relatively hot side of the strand becomes extended relative to the opposite, relatively cool side thereof.

3. Strand treatment according to claim 2, wherein the relatively hot side of the strand is forwarded away from the treating location faster than the relatively cool side thereof.

4. Strand treatment according to claim 1, wherein the strand is forwarded away from the treating location by at least one roll rotating in essentially non-slipping contact therewith at the treating location.

5. Strand treatment according to claim 3, wherein the strand is forwarded away from the treating location by a roll that is relatively hot as compared with the temperature of the side of the strand not in contact therewith.

6. Strand treatment according to claim 1, wherein the strand is forwarded away from the treating location by a pair of nip rolls in essentially non-slipping contact therewith on opposite sides thereof at the treating location.

7. Strand treatment according to claim 6, wherein one roll is relatively hot and the other roll relatively cool and the hot roll is rotated at a faster surface speed than the cool roll.

8. Process for treating a textile strand, comprising establishing a temperature gradient in the strand from one side thereof to the opposite side at essentially a point location movable lengthwise of the strand and thereby producing a length differential from one side of the strand to the opposite side thereof and so imparting a convoluted configuration to the strand.

9. Strand treatment according to claim 8, wherein the strand is forwarded longitudinally, thereby shifting the point location of the temperature gradient lengthwise of the strand.

10. Strand treatment according to claim 9, wherein the magnitude of the temperature gradient is varied during the shifting thereof lengthwise of the strand, thereby producing a variably convoluted strand.

11. Strand treatment according to claim 10, wherein the magnitude of the temperature gradient is reduced to zero intermittently, thereby producing a strand having unconvoluted portions interspersed between adjacent convoluted portions.

12. Strand treatment according to claim 8 wherein the heated side of the strand is flattened and occupies the outside of the resulting convolution.

References Cited

UNITED STATES PATENTS

| | | |
|---|---|---|
| 2,974,391 | 3/1961 | Speakman et al. |
| 3,166,822 | 1/1965 | Starkie. |
| 3,176,373 | 4/1965 | Taylor. |
| 3,226,792 | 1/1966 | Starkie et al. |

LOUIS K. RIMRODT, Primary Examiner